Aug. 2, 1949.   H. T. SPARROW   2,477,668
CONTROL APPARATUS
Filed Feb. 22, 1943                     5 Sheets-Sheet 2

Inventor
HUBERT T. SPARROW
By
George H. Fisher
Attorney

Aug. 2, 1949.   H. T. SPARROW   2,477,668
CONTROL APPARATUS
Filed Feb. 22, 1943   5 Sheets-Sheet 3

Inventor
HUBERT T. SPARROW
George H. Fisher
Attorney

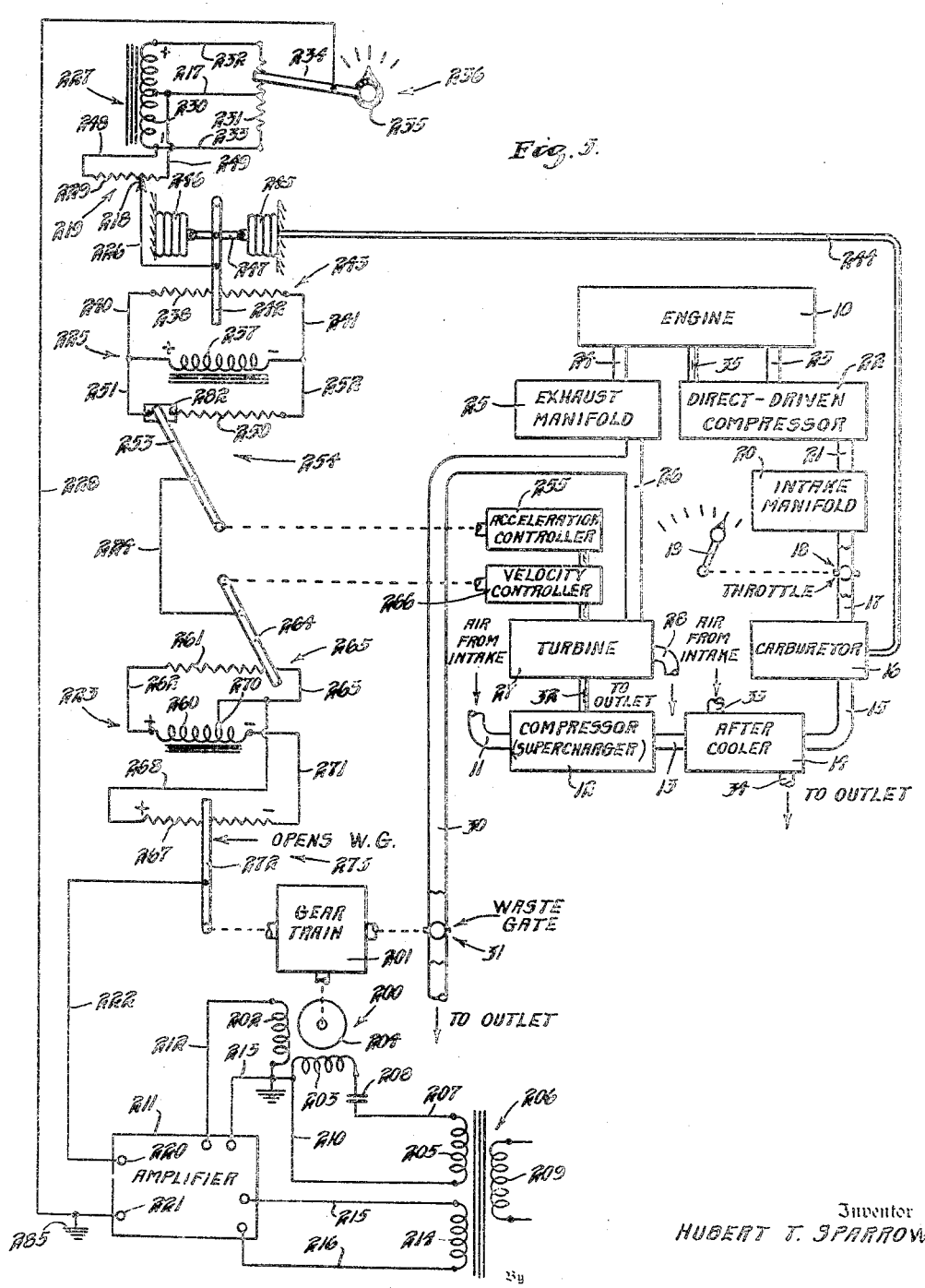

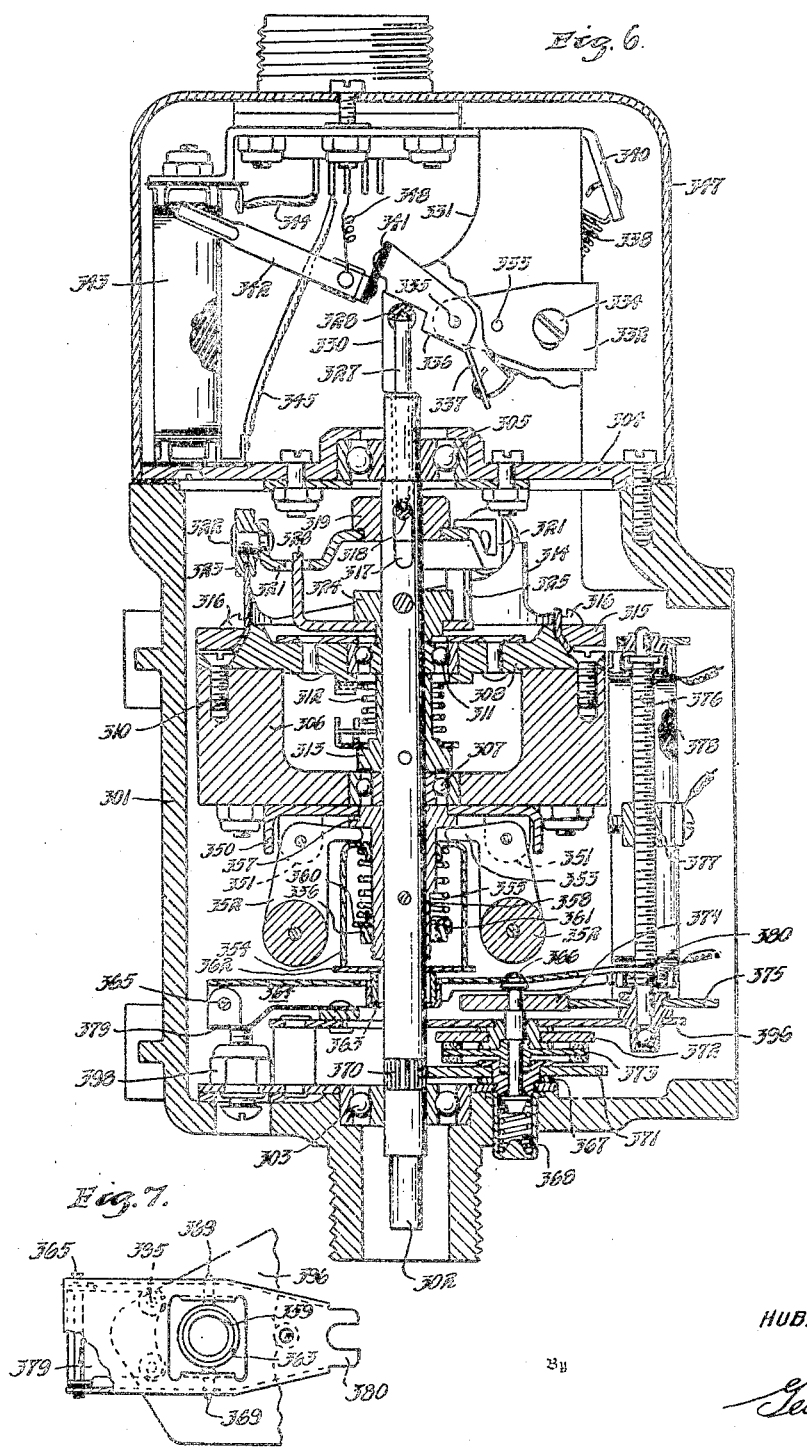

Patented Aug. 2, 1949

2,477,668

UNITED STATES PATENT OFFICE 2,477,668

CONTROL APPARATUS

Hubert T. Sparrow, Minneapolis, Minn., assignor to Minneapolis-Honeywell Regulator Company, Minneapolis, Minn., a corporation of Delaware Application February 22, 1943, Serial No. 476,797

17 Claims. (Cl. 230—5)

The present invention relates to apparatus for controlling the discharge pressure of a turbine driven compressor provided in connection with an internal combustion engine, for supplying the intake manifold with air at a pressure greater than atmospheric.

Internal combustion engines used on aircraft are commonly provided with a compressor, usually termed a supercharger, which is driven by a turbine powered by the exhaust gases of the engine. The speed of the turbine, and hence the compression ratio of the compressor, is controlled by a device termed a waste gate, which is a valve or damper which by-passes part of the exhaust gases from the exhaust manifold directly to the atmosphere instead of directing them through the turbine. In order to secure optimum operation of an engine, it is usually desirable to maintain the intake manifold pressure of the engine at a substantially constant value. The intake manifold pressure may be varied either by adjusting the position of the throttle or by adjusting the position of the waste gate associated with the turbine which drives the supercharger.

It is therefore an object of the present invention to provide an improved system for automatically controlling the waste gate of a turbine in order to control the pressure of the air discharged by a compressor driven by the turbine.

A further object of the present invention is to provide an improved control system of the type disclosed in my co-pending sole application, Serial No. 474,378, filed February 1, 1943, and in my co-pending joint application with Albert E. Baak, Serial No. 476,798, filed February 22, 1943, now Patent No. 2,474,203 of June 21, 1949.

Another object of the present invention is to provide a system for controlling the pressure of the air discharged by a turbine driven compressor, in which the operation of the system is modulatingly compensated in accordance with the acceleration of the compressor.

A further object is to provide a system which is modulatingly compensated, both for acceleration of the compressor and for the velocity of the compressor, when the velocity exceeds a predetermined value.

A further object is to provide, in such a control system, means for compensating the action of the system in accordance with an integrated time function of the velocity of the compressor.

Another object of the present invention is to provide a proportioning control system which is modulatingly responsive to a controlling condition and to an integrated time function of a limiting condition.

Other objects and advantages of the present invention will become apparent from a consideration of the appended specification, claims, and drawings, in which:

Figure 5 illustrates, somewhat diagrammatically, a modified form of intake manifold pressure control system, built in accordance with certain principles of my invention;

Figure 6 is a cross-sectional elevation of a control device responsive to the acceleration and to an integrated time function of the velocity of a rotating shaft, which may be used in the system of Figure 5, and Figure 7 is an auxiliary view showing certain details of the velocity responsive controller contained in the device of Figure 6.

Figure 1:
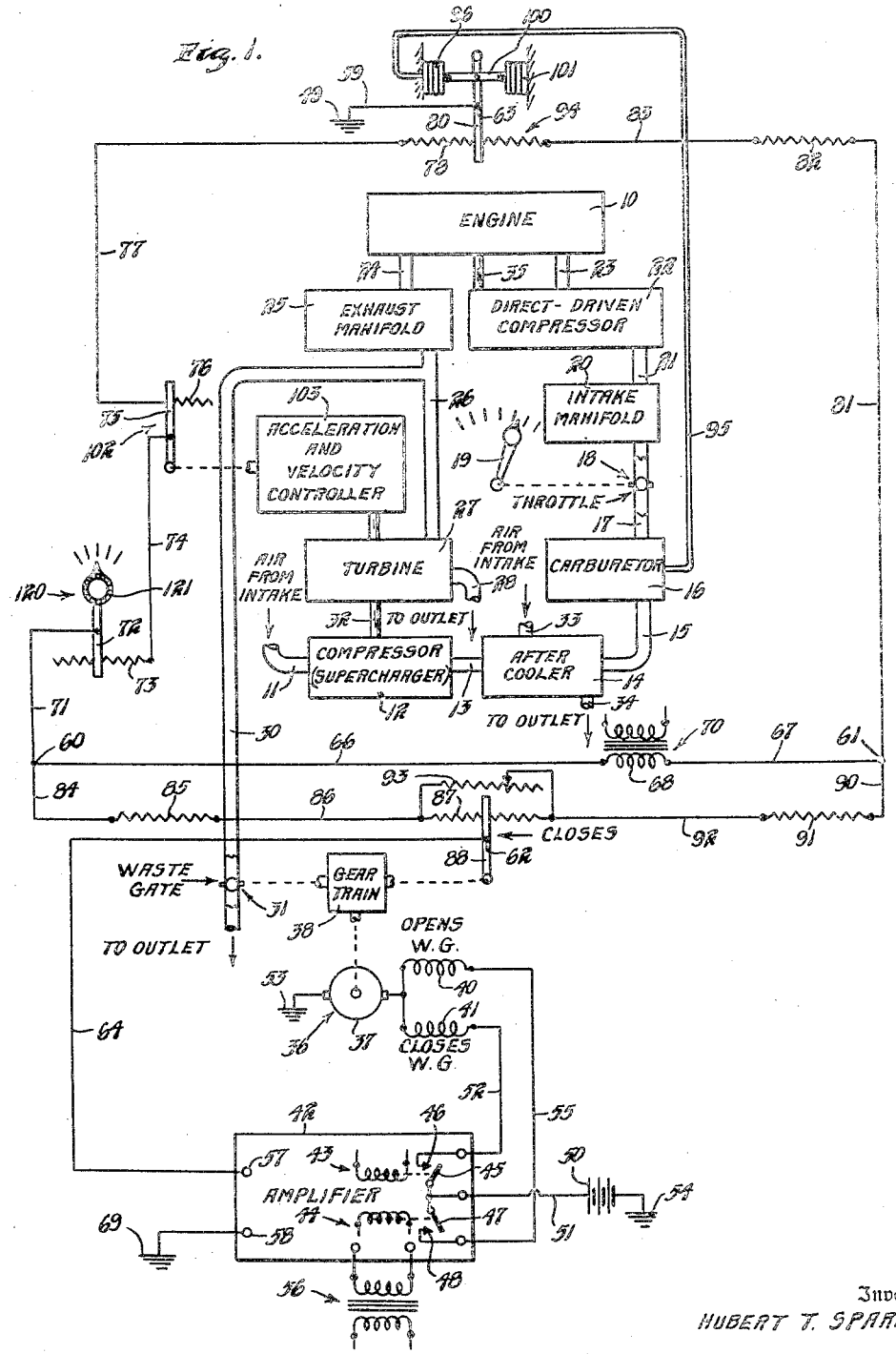
Figure 1 illustrates, somewhat diagrammatically, an intake manifold pressure control system embodying certain features of my invention.

Referring to Figure 1, there is schematically shown an internal combustion engine 10, which may be in an aircraft. Air for supporting combustion in the engine 10 passes from an intake, not shown in the drawing and conventionally located in the leading edge of the wing of the aircraft, through a conduit 11, a compressor 12, a conduit 13, an after-cooler 14, a conduit 15, a carburetor 16, a conduit 17 in which a throttle 18 is located, an intake manifold 20, a conduit 21, a direct-driven compressor 22, and a conduit 23 to the engine 10.

The exhaust gases from the engine 10 pass through a conduit 24 to an exhaust manifold 25, and thence may pass through a conduit 26, a turbine 27, and a conduit 28 to a suitable outlet not shown in the drawing.

A conduit 30 connects the conduit 26 with the exhaust gas outlet previously mentioned. In the conduit 30 is located a waste gate 31, whose position determines the proportion of the total exhaust gas of the engine that passes through the turbine 26. The compressor 12 is driven by the turbine 27 through a shaft 32.

The after-cooler 14 is provided to reduce the temperature of the air leaving the compressor, wherein its temperature is increased due to the heat of compression. In the after-cooler, the compressed air received from the compressor passes in heat exchange relation with air received from the intake, previously mentioned, through a conduit 33, and discharged through a conduit 34 to the outlet.

In the carburetor 16, fuel from a supply not shown is mixed with the air. The throttle 18 may be positioned by operation of a lever 19. In most carburetors, the throttle is within the carburetor itself. It is shown separately in the drawing merely for convenience.

The compressor 22 is directly driven by the engine 10 through the shaft 35. Such a direct-driven compressor is usually geared so that it rotates faster than the engine, and in many engines it is utilized not only as a compressor, but to distribute evenly the mixture of fuel and air to the various engine cylinders. Although the compressor 22 is shown as separate from the intake manifold, in most cases it is located within the intake manifold.

The waste gate 31 is driven by a motor 36 through a gear train schematically indicated at 38. The motor 36, which is of the direct current, series wound type, includes an armature 37 and a pair of field windings 40 and 41. As indicated by the legend in the drawing, the motor and the gear train are so constructed that when field winding 40 is energized the motor rotates in a direction to open the waste gate, and when field winding 41 is energized, the motor rotates in a direction to close the waste gate.

Energization of motor 36 is controlled by an amplifier 42. The amplifier 42 may be of any suitable type, although I prefer to use one of the type illustrated in Figure 2 of the co-pending application of Albert P. Upton, Serial No. 437,561, filed April 3, 1942.

The amplifier 42 includes a pair of relays 43 and 44. The relay 43 controls the movements of a switch arm 45 with respect to a stationary contact 46, with which it is engaged when the winding of relay 43 is energized. Similarly, the relay 44 controls the movements of a switch arm 47 with respect to a stationary contact 48, with which it is engaged when the winding of relay 44 is energized.

When switch arm 45 engages contact 46, an energizing circuit is completed for motor 36 which includes field winding 41. This circuit may be traced from the left-hand terminal of a battery 50, through a conductor 51, switch arm 45, contact 46, a conductor 52, field winding 41, armature 37, and ground connections 53 and 54 to the right-hand terminal of battery 50.

When switch arm 47 engages contact 48, an energizing circuit is completed for motor 36 which includes field winding 40. This circuit may be traced from the left-hand terminal of battery 50 through conductor 51, switch arm 47, contact 48, a conductor 55, field winding 40, armature 37, and ground connections 53 and 54 to the right-hand terminal of battery 50.

The amplifier 42 has signal input terminals 57 and 58, and operates to selectively energize the windings of the relays 43 and 44 in accordance with the phase of an alternating electrical potential applied to the input terminals 57 and 58. Electrical energy is supplied to the amplifier 42 from a transformer 56.

The phase of the electrical potential applied to input terminals 57 and 58 is determined by an electrical network of the Wheatstone bridge type, having input terminals 60 and 61 and output terminals 62 and 63. Output terminal 62 of the bridge circuit is connected through conductor 64 to the input terminal 57 of amplifier 42. Output terminal 63 is connected through conductor 59, ground connections 49 and 69 to input terminal 58 of amplifier 42. The input terminals 60 and 61 of the bridge circuit are connected through conductors 66 and 67, respectively, to the opposite terminals of a secondary winding 68 of a transformer 70. The transformers 56 and 70 are preferably connected to the same source of alternating electrical energy.

The upper left branch of the bridge circuit, as it appears in the drawing, connects input terminal 60 with output terminal 63. This branch may be traced from input terminal 60 through a conductor 71, a slider 72, a slidewire resistance 73 which cooperates with slider 72, a conductor 74, a slider 75, a slidewire resistance 76 which cooperates with slider 75, a conductor 77, a portion of a slidewire resistance 78, and a slider 80 which cooperates with resistance 78, to the output terminal 63, which is shown as being located on the slider 80.

The upper right branch of the bridge circuit, as it appears in the drawing, connects input terminal 61 with output terminal 63. This branch may be traced from input terminal 61 through a conductor 81, a fixed resistance 82, a conductor 83, a portion of resistance 78, and slider 80 to output terminal 63.

The lower left branch of the bridge circuit, as it appears in the drawing, connects input terminal 60 with output terminal 62. This branch may be traced from input terminal 60 through a conductor 84, a fixed resistance 85, a conductor 86, a portion of a slidewire resistance 87, and a slider 88 cooperating with resistance 87, to output terminal 62 which is shown as being located on slider 88.

The lower right branch of the bridge circuit connects input terminal 61 with output terminal 62, and may be traced from input terminal 61 through a conductor 90, a fixed resistance 91, a conductor 92, a portion of resistance 87, and slider 88 to output terminal 62.

A variable resistance 93 is connected in parallel with the resistance 87, for purposes to be described later.

The slider 80 and the resistance 78 together form a control potentiometer 94. The slider 80 is moved along the resistance 78 in accordance with the absolute pressure of the air supplied by the compressor 12. This pressure may be measured at any point in the path of the air discharged by the supercharger, but is preferably measured at a point fairly remote from the supercharger and preceded by a straight stretch of conduit, so that the effects of turbulence in the flowing air are avoided. In the modification of my invention illustrated in the drawing, I have shown, by way of example, that the pressure for operating the controller 94 is taken from the carburetor 16 through a conduit 95 to an expansible bellows 96. The left end of the bellows 96 is fixed and its right end is free to move in accordance with the pressure existing within the bellows. A link 100 is attached to the free end of the bellows 96. The opposite end of the link 100 is connected to the free end of a second bellows 101, the interior of which is evacuated. An intermediate point on the link 100 is connected, as by a pin and slot connection, (not shown), to the slider 80, which is mounted for pivotal movement about its upper end.

Since the interior of bellows 101 is evacuated, changes in the atmospheric pressure, acting through the bellows 101, produce forces tending to move the link 100 in a direction opposite to an equal force produced by the same atmospheric pressure acting on the bellows 96. For example, as the atmospheric pressure increases, both the bellows 96 and 101 tend to collapse. The bellows 96 therefore exerts a force on link 100 tending to move it to the left, while the bellows 101 exerts a force on link 100 tending to move it to the right. The effects of the atmospheric pressure on the two bellows therefore counteract each other, so that the position of the slider 80 is determined only by the absolute pressure existing within the bellows 96.

The resistance 76 and the slider 75 together form a compensating controller 102. The slider 75 is moved across resistance 76 by an acceleration and velocity responsive control device 103, which is illustrated in detail in Figures 2, 3, and 4. For present purposes, it is believed sufficient to state that the slider 75 is moved across the resistance 76 in accordance with the acceleration of the shaft 32, and that when the velocity of the shaft 32 exceeds a predetermined value, the slider 75 is additionally moved across resistance 76 in accordance with the excess of the shaft velocity above that predetermined value.

The slider 72 and resistance 73 together form a control point adjuster 120, which is manually operable by means of a knob 121. The knob 121 is located so as to be under the control of one of the members of the crew of the aircraft, preferably the pilot.

The slider 88 and resistance 87 together form a rebalancing potentiometer 122. The slider 88 is moved along the resistance 87 by the motor 36, acting through the gear train 38.

*Operation of Figure 1*

When the parts are in the positions shown in the drawing, the waste gate is half open, as indicated by the position of the slider 62 at the midpoint of resistance 87. The bridge circuit is balanced, so that the bridge output terminals 62 and 63 are at the same potential. Hence no signal potential is applied to the input terminals 57 and 58 of amplifier 42, and neither of the relays 43 and 44 is energized. The motor 36 therefore is not energized and the waste gate remains at its half open position.

Now let it be assumed that the pressure of the air in the carburetor 16 decreases, for example, due to an increase in the altitude of the aircraft. Such a decrease in pressure is transmitted to the interior of bellows 96 through the conduit 95. As the pressure inside bellows 96 decreases, the slider 80 is moved to the left along resistance 78. The potential of slider 80, and hence the potential of output terminal 63 then changes, becoming closer to the potential of input terminal 60. A potential difference then exists between output terminals 63 and 62 of the bridge circuit, and the phase of this potential is the same as that which exists between bridge input terminals 60 and 61, respectively. It may be assumed that the amplifier 42 is so connected that it responds to a potential of this phase applied to its input terminals by causing energization of relay 43. Energization of relay 43 completes the energizing circuit for motor 36, previously traced, which causes rotation of motor 36 in a direction to close the waste gate and to move the slider 88 to the left along resistance 87. Movement of slider 88 to the left along resistance 87 changes the potential of output terminal 62 toward that of input terminal 60, so that the potential difference between the output terminals 62 and 63 is reduced. At the same time, movement of the waste gate towards closed position causes an increase in the pressure in the exhaust manifold, and an increasing proportion of the exhaust gases of the engine then passes through the turbine 27, thereby increasing the speed of the turbine and the compressor 12. This increase in speed of the compressor 12 causes an increase in the compression ratio between the output pressure and the input pressure of the compressor. The intake manifold pressure is therefore increased, and the increase is transmitted through the duct 95 to the interior of bellows 96. The increased pressure in bellows 96 moves the slider 80 back to the right along resistance 78. As soon as the sliders 80 and 88 reach positions at which their potentials are the same, the signal potential impressed on the input terminals of amplifier 42 is reduced to zero, and the relay 43 is therefore deenergized. The motor 36 then stops, with the waste gate remaining in a new position. It will be readily understood that the distance moved by the waste gate is proportional to the pressure drop which initiated the movement, the proportion being determined by the ratio between the potential drops per unit length along the resistances 78 and 87.

In a similar manner, an increase in the pressure of the air supplied by the compressor 12 causes a movement of slider 80 to the right along resistance 78, which changes the potential of output terminal 63 with respect to that of output terminal 62 in a sense opposite to that encountered under the conditions previously described. The alternating signal impressed on the input terminals of amplifier 42 is then of a phase opposite to that which was previously impressed on its input terminals. The amplifier 42 responds to this new signal potential by causing energization of the winding of relay 44. This operates switch arm 47 into engagement with contact 48, completing the energizing circuit for motor 36 which includes field winding 40 and causes rotation of the motor in a direction to open the waste gate and to move the slider 88 to the right along resistance 87. This motion continues until the slider 88 has moved a sufficient amount to balance the change in position of slider 80 with respect to resistance 78. The opening movement of the waste gate allows a greater proportion of the total exhaust gases to escape to the atmosphere, thereby reducing the pressure in the exhaust manifold, and reducing the speed of the turbine and compressor which results in a reduction of the intake manifold pressure.

By manipulating the variable resistance 93, the total resistance between the terminals of resistance 87 may be varied, and hence the total potential drop across the resistance 87 is likewise varied. Since the total potential drop is varied, the potential drop per unit length of resistance 87 is changed. Therefore, by changing the variable resistance 93, it is possible to adjust the distance through which the slider 88 must move along resistance 87 in order to balance the bridge circuit after a given unbalancing movement of slider 80 along resistance 78. The resistance 93 may be termed a ratio adjusting resistance, since it determines the ratio between a given movement of the controlling slider 80 and the required following movement of the rebalancing slider 88.

When the turbine 27 is accelerating, due to a movement of the waste gate 31 toward closed position, the turbine may continue to accelerate after the pressure controller 94 has been satisfied, because of the inherent lag in the system between the carburetor 16 where the pressure sensing take-off is located, and the exhaust manifold, and because of the inertia of the turbine and compressor. If such an acceleration of the turbine continues after the pressure controller 94, has been satisfied, it causes an abnormal increase in the pressure of the air supplied by the supercharger, which acts through the controller 94 and the system which controls motor 36 to cause a movement of the waste gate back toward its open position. This movement of the waste gate toward open position in turn causes a decrease in the pressure of the air supplied by the compressor, and a hunting condition results in which the pressure being controlled continuously oscillates about the value which it is desired to maintain.

The establishment of such a hunting or overshooting condition may be prevented by the use of the compensating controller 102. As previously mentioned, the slider 75 is moved along resistance 76 in accordance with the acceleration and velocity of the shaft 32 of the turbine 27. The movement of slider 75 along resistance 76 is in such a direction that as the acceleration or velocity of the shaft 32 increases, the amount of resistance 76 connected in the upper left branch of the bridge circuit is increased. This increased resistance in the upper left branch of the bridge circuit causes a response of the amplifier 42 and motor 36 to drive the waste gate condition to open position, or at least, tends to oppose the unbalance of the bridge circuit which is causing motion of the waste gate towards its closed position.

The compensating controller 102 may therefore be said to anticipate the continued acceleration of the turbine 27, and to compensate the system for such continued acceleration, by stopping the closing movement of the waste gate, or even by opening the waste gate slightly, while the pressure of the air discharged by the compressor is still below the desired value. When the waste gate is stopped in this manner, the continued acceleration of the turbine only serves to bring the compressor discharge pressure up to the value which it is desired to maintain, and prevents the establishment of a hunting or overshooting condition.

The control point adjuster 120 may be manually operated to increase or decrease the resistance in the upper left branch of the bridge circuit. The setting of controller 120 determines the particular position at which the waste gate is stopped for a given value of pressure existing in the carburetor 16. It may therefore be used to set the value of pressure in the carburetor 16 which the system is to maintain.

It may be desirable for the pilot to select any supercharger discharge pressure within a range of from 15 to 32 inches of mercury. After such a value of discharge pressure has been selected, it is usually desired that the system maintain that pressure within a range of one inch of mercury more or less than the selected value regardless of the altitude of the aircraft. In order to produce these results, resistance 87 should be chosen so that it is 2/17 of the resistance of element 78. In other words, the slider 80 is to move from one end to the other of resistance 78 as the pressure at the carburetor varies over a range of 17 inches, and the slider 88 is to move from one end to the other of resistance 87 as the slider 80 moves through a distance corresponding to a pressure change of two inches of mercury. By manipulation of resistance 93, the total resistance between the terminals of resistance element 87 may be varied, so that the operating differential of the system may be varied. The operating differential may be defined as the variation in pressure at the carburetor needed to cause movement of the waste gate from one end to the other of its range.

Since the control point selector 120 must vary the relationship between the control potentiometer 94 and the rebalancing potentiometer 122 over a very wide range of positions of the slider 80, and a relatively narrow range of positions of the slider 88, the resistance of element 73 should be such that its total unbalancing effect on the bridge circuit is comparable to that of resistance 78. Since the compensating controller 102 may be required, under certain conditions, to completely overcome the effect of the main controller 94, resistance 76 should also be such that its unbalancing effect may be comparable to that of resistance 78.

If the proportion of resistance 73 connected in the upper left branch of the bridge circuit is increased, then the resistance of the upper left branch is increased in proportion to the resistance of the upper right branch. An increase in resistance element 73 therefore has the same unbalancing effect on the system as an increase in the intake manifold pressure. Such an increase causes the waste gate to move towards open position, thereby reducing the intake manifold pressure and causing the slider 80 to move to the left along resistance 78. Summarizing, it may be stated that an operation of control point adjuster 120 to increase the proportion of resistance 73 connected in the system lowers the value of intake manifold pressure selected, and an operation of controller 120 to decrease the proportion of resistance element 73 connected in the system operates to increase the pressure selected.

Figures 2, 3, and 4

Figure 2:
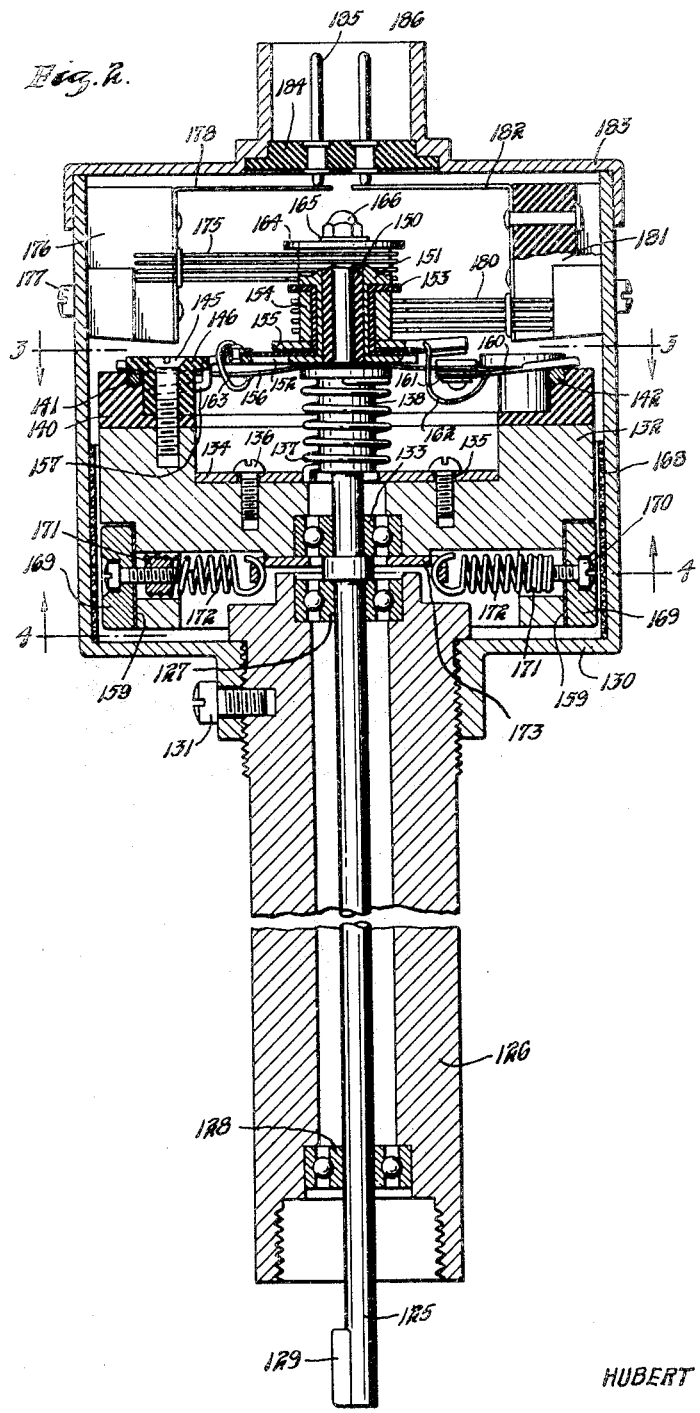
Figure 2 is a cross-sectional elevation of an acceleration and velocity responsive control device which may be used in the system of Figure 1.

Referring now to Figure 2, there is shown a control device which may be used as the acceleration and velocity responsive control device 103 of Figure 1. This acceleration and velocity responsive control device is claimed in my co-pending divisional application Serial No. 714,219, filed December 5, 1946. The control device is described in this specification with the purpose of fully describing the apparatus essential to my novel control system. In Figure 2, there is shown an elongated shaft 125, provided with a key 129 at its lower end, for operative engagement with an extension on shaft 32 of Figure 1. The shaft 125 passes through a protecting sleeve 126, and is journalled in bearings 127 and 128 at the opposite ends of the sleeve 126. The upper end of the sleeve 126, as it appears in the drawing, is threaded on its outer surface for engagement with internal threads in an aperture located centrally of a generally cylindrical housing 130. A set screw 131 is provided to lock the housing 130 on the sleeve 126.

Within the housing 130 a generally cylindrical mass 132 is rotatably mounted on the shaft 125 by means of a bearing 133. The mass 132 has a central cup-shaped recess in its upper surface, on the bottom of which is a disk 134. The disk 134 is provided with a pair of arcuate slots 135, which are diametrically spaced. A pair of screws 136 pass through the slots 135 and threadedly engage holes in the mass 132. The construction is such that the disk 134 may be rotated relative to the mass 132 to an extent determined by the length of the slots 135, and may be locked in any angular position within its range of movement by tightening the screws 136.

The disk 134 is provided with an aperture near its center to receive one end of a coil spring 137, which encircles a sleeve 138 of insulating material fixed on the shaft 125. The other end of the coil spring 137 engages a suitable aperture in the sleeve 138. The spring 137 resiliently connects the shaft 125 and the mass 132, so that as long as the shaft rotates at a constant speed, the mass 132 likewise rotates at the same constant speed. Upon acceleration or deceleration of the shaft 125, the mass 132, because of its inertia, does not change its speed as fast as the shaft 125, and the mass 132 therefore changes its angular position relative to the shaft 125. The spring 137 permits such a change in the relative angular positions of the shaft 125 and the mass 132.

On the upper surface of the mass 132 is mounted an annular insulating member 140. Molded in the upper surface of the insulating member 140, at its inner periphery, is a semi-circular slide-wire resistance element 141. Diametrically opposite the resistance 141, and molded in a similar manner in the upper surface of the insulating member 140, is a contact member 142. One end of the contact member 142 may be in direct electrical contact with one end of the resistance element 141, as indicated at 143 in Figure 3. The opposite end of the contact member 142 is electrically separated from the opposite end of resistance 141 by means of an insulating spacer 144. If the resistance 141 is to be used as a potentiometer resistance, rather than a rheostat resistance, both ends of the resistance 141 should be insulated from corresponding ends of the contact member 142.

The insulating member 140, the resistance 141, and the contact member 142 are fixed to the mass 132 by means of screws 145, which pass through flanged insulating sleeves 146, and through apertures in the insulating member 140 into threaded engagement with the mass 132. Portions of the flanges on the sleeves 146 overlie portions of the contact member 142, the resistance 141, and the insulating member 140, holding them fixed in position on the mass 132.

Fixed on the shaft 125 above the insulating sleeve 138 is an insulating sleeve 150. Outside the sleeve 150 is a second sleeve 151, of electrically conductive material. The sleeve 151 has a portion of wide diameter, which serves as a current conducting slip ring and a portion of reduced diameter which serves to electrically connect the slip ring with a plate 152, of electrically conductive material. The plate 152 is apertured to receive the lower end of the sleeve 150, and is thereby fixed for rotation with the shaft 125. Outside the reduced lower portion of the conductive sleeve 151 is a flanged sleeve 153, of insulating material. Outside the sleeve 153 is a second slip ring 154. Also outside the sleeve 153 and in electrically conducting contact with slip ring 154, is an electrically conductive plate 155, which is apertured to receive the sleeve 153, and is held thereby in fixed relation with the shaft 125.

A contact member 156 of electrically conductive, flexible material is loosely carried by but insulated from the shaft 125 between the plate 152 and the upper end of sleeve 138 which may be of insulating material. The contact member 156 is insulated from both the shaft 125 and the sleeve 138. The plate 152 has an offset portion 157. That portion of the plate 152 connecting the offset portion 157 with the main body of the plate is apertured, as indicated at 158 in Figure 3, to permit the contact member 156 to pass through. The aperture 158 is wider than the contact 156 so that a certain amount of lost motion is permitted between contact member 156 and plate 152. The extremity of contact member 156 is downwardly convex, so as to provide a suitable surface for sliding along the resistance 141. Diametrically opposite the end of contact member 156 which engages resistance 141, the contact member 156 carries a second contact member 160. The contact member 160 is insulatingly supported on the contact member 156, as indicated at 161. The contact member 160 is electrically connected to the conductive plate 155, by means of a pig tail connection 162. Similarly, the contact member 156 is connected to the conductive plate 152 by a pig tail connection 163.

From the foregoing description, it should be apparent that the contact member 142 is electrically connected through contact member 160, pig tail connection 162, and plate 155 to slip ring 154. On the other hand, the resistance element 141 is electrically connected through contact member 156, pig tail connection 163, and plate 152 to slip ring 151. At any instant, the angular position of contact members 156 and 160 is determined by the angular position of shaft 125. The angular position of resistance 141 with respect to contact member 156 is determined by the angular position of mass 132 with respect to shaft 125, which is a measure of the acceleration or deceleration of the shaft 125. Therefore, it will be seen that a variable portion of resistance 141 is connected between the slip rings 151 and 154, depending upon the angular acceleration of the shaft 125.

The various sleeves 150, 151, 153 and 154 and the plates 152 and 155 are held in assembled relation on the shaft 125 by an insulating plate 164, a washer 165 and a nut 166.

Figure 4:
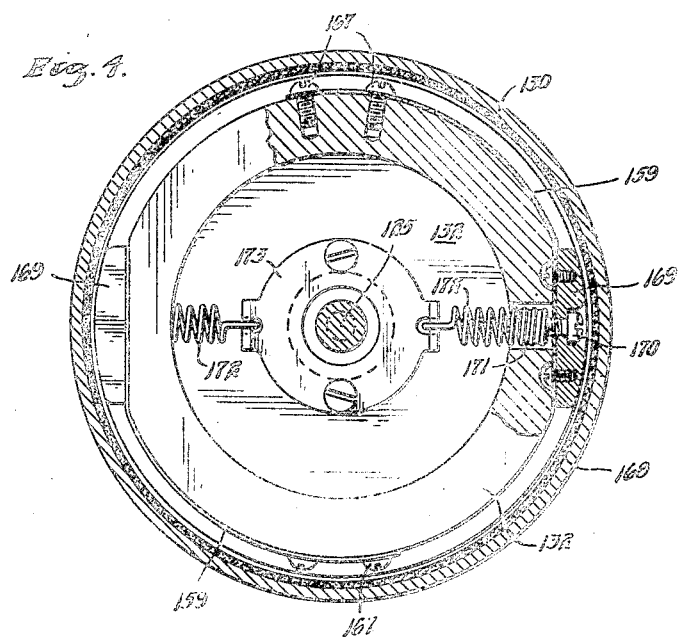
Figure 4 is a cross-sectional view taken on the line 4—4 of Figure 2, looking in the direction of the arrows.

The inner surface of the lower portion of casing 130 is provided with a lining 168 of cork or other suitable friction material. Diametrically opposite portions of the mass 132 are cut away to receive a pair of weights 169. As indicated in Figure 4, each weight 169 is carried at the end of an elongated flexible guide member 159, which closely engages the surface of mass 132 for approximately one-fourth of its periphery. The opposite end of the member 159 is fixed to the mass 132 as by screws 167.

A screw 170 passes through a center aperture in each of the weights 169, a registering aperture in the flexible member 159, and a registering aperture in the mass 132. A nut 171 carried by each screw 170 holds one end of one of a pair of tension springs 172. The other end of each of the tension springs 172 is hooked through a suitable aperture in a floating ring 173. The apertures in the ring 173, which receive the ends of the springs 172, are diametrically spaced.

The weights 169 are free to move radially of the shaft 125, but are restrained from such movement by the springs 172. When the velocity of the shaft 125 reaches a predetermined value, which is established by the tension of springs 172, the weights 169 are moved outwardly against the springs 172 by the centrifugal force acting on them. When this occurs, the weights 169 engage the friction surface 168, thereby applying a braking torque to the mass 132, and changing the angular position of the mass 132 relative to that of shaft 125 in the same manner as if the relative angular positions of the mass 132 and shaft 125 had been changed by an acceleration of the shaft 125. Therefore, it may be seen that the amount of resistance connected between the slip rings 151 and 154 depends not only upon the acceleration of the shaft 125, but on its velocity after that velocity reaches a predetermined value.

A pair of brushes 175 and 180, each of which is composed of a plurality of flexible fingers, engage the slip rings 151 and 154, respectively. The brush 175 is supported on an insulating block 176 attached to the side of casing 130 by means of a screw 177. The block 176 also carries a conducting strip 178, which is permanently held in electrically conductive relation with the brush 175. The strip 178 has a portion which extends inwardly from the block 176 toward the center of the casing 130. Similarly, the brush 180 is supported on a block 181, and held in electrically conducting relation with a conductor strip 182. The casing 130 is provided with a cover 183, which may be attached thereto by any suitable means, not shown. The cover 183 carries at its center portion an insulating plate 184 in which are suitably fastened a pair of electrical connector pins 185 and 186, of conventional form. The inner ends of the pins 185 and 186 are adapted to engage the conductor strips 178 and 182 when the cover 183 is in place on the casing 130.

Figure 3:
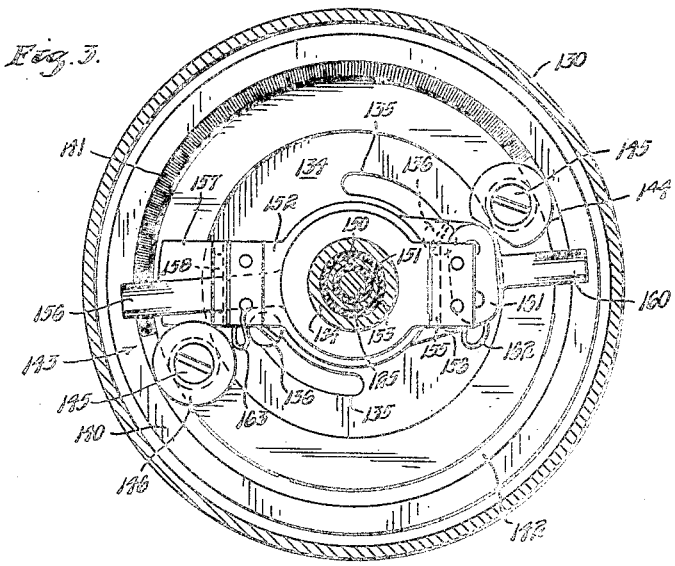
Figure 3 is a cross-sectional view taken along the line 3—3 of Figure 2, looking in the direction of the arrows.

When the device illustrated in Figures 2, 3, and 4 is used in the system of Figure 1, the conductor pin 185 is electrically connected to the conductor 74 of Figure 1, and the pin 186 is electrically connected to the conductor 77 of Figure 1.

*Figure 5*

There is shown in Figure 5 a modified form of electrical control system, which operates in the same general manner as the system of Figure 1 to control the pressure of the air supplied to the intake manifold of an internal combustion engine. As far as the engine, its air induction and exhaust systems are concerned, the arrangement of Figure 5 is the same as that in Figure 1. Therefore these elements of the system shown in Figure 5 have been given the same reference characters as the corresponding elements in Figure 1, and will not be further described in detail.

The waste gate 31 of Figure 5 is driven by a motor 200 through a gear train 201. The motor 200 is of the split phase type, being provided with a pair of field windings 202 and 203, which are spaced 90 electrical degrees apart, and an armature 204. The field winding 203 is supplied with electrical energy from a secondary winding 205 of a transformer 206. The energizing circuit for winding 203 may be traced from the upper terminal of secondary winding 205 through a conductor 207, a condenser 208, motor field winding 203, and a conductor 210 to the lower terminal of secondary winding 205.

The flow of electrical energy to the field winding 202 is controlled by an amplifier 211, to which winding 202 is connected through a pair of conductors 212 and 213. The amplifier 211 is supplied with electrical energy from another secondary winding 214 on the transformer 206 to which it is connected through a pair of conductors 215 and 216.

The amplifier 211 is provided with a pair of signal input terminals 220 and 221, and operates to supply the motor field winding 202 with alternating current of a phase dependent upon the phase of an alternating signal impressed upon the input terminals 220 and 221. Any suitable amplifier having such a characteristic may be used, but I prefer to use one of the type shown in Figure 1 of the co-pending application of Albert P. Upton, Serial No. 437,561, filed April 3, 1942, now Patent No. 2,423,534 of July 8, 1947.

It will be seen that if the motor field winding 202 is supplied with alternating current which leads the current supplied to winding 203 by 90°, the motor 200 will rotate in one direction, while if the field winding 202 is supplied with current which lags the current in winding 202 by 90°, the motor 200 operates in the opposite direction.

The signal potential applied to the input terminals 220 and 221 of amplifier 211 is determined by the electrical conditions existing in a compound network, which is in reality three electrical networks connected in series. The circuit between the amplifier input terminals 220 and 211 may be traced from terminal 220 through a conductor 222, a first electrical network 223, a conductor 224, a second electrical network 225, a conductor 226, a third electrical network 227, and a conductor 228 to amplifier input terminal 221.

The network 227 includes a transformer secondary winding 230, across whose terminals is connected a slidewire resistance 231, by means of conductors 232 and 233. The conductor 228 is connected to a slider 234 which cooperates with resistance 231, and is movable therealong by operation of a knob 235. The slider 234 and the resistance 231 together comprise a control point adjuster 236 for the intake manifold pressure control system.

Another resistance 229 has one of its terminals connected by a conductor 248 to the lower terminal of secondary winding 230, and its opposite terminal is connected through a conductor 249 to a center tap on secondary winding 230. A slider 218 cooperates with the slidewire resistance 229, and is manually adjustable with respect to that slidewire. The slider 218 and the resistance 229 together form a calibrating potentiometer 219. The center tap on winding 230 is connected to the center of resistance 231 by a conductor 217. The conductor 217 is provided to decrease the impedance of the network between slider 234 and slider 218, and does not otherwise affect the operation of the system.

The electrical network 225 includes a secondary winding 237, across whose terminals is connected a slidewire resistance 238 by means of conductors 240 and 241. A slider 242 cooperates with resistance 238, and is connected to conductor 226. The slider 242 and resistance 238 together form a main pressure controller 243. The main controller 243 is operated in accordance with the air pressure existing at the carburetor 16. A pressure take-off duct 244 connects the carburetor 16 with the interior of a bellows 245. A second bellows 246 is evacuated, so that its expansion and contraction depends only upon atmospheric pressure. The two bellows 245 and 246 are mounted with their free ends extending toward each other, and those free ends are connected by a link 247. A center point on the link 247 is connected as by a pin and slot connection (not shown) with the slider 242. The construction is generally the same as that of the bellows 96 and 101 which operate the controller 94 of Figure 1.

A second slidewire resistance 250 is also connected across the terminals of secondary winding 237, through conductors 251 and 252. A slider 253 cooperates with the resistance 250 and is connected to conductor 224. The resistance 250 and slider 253 together form an acceleration compensating controller 254. The controller 254 is operated in accordance with the acceleration of the turbine shaft 32 by an acceleration responsive control device schematically indicated at 255. The acceleration responsive control device 255 may be, for example, a device such as that shown in detail in Figure 6. For the present purposes, it may be stated that the slider 253 is maintained in the position shown in the drawing as long as the shaft 32 rotates at a constant speed or decelerates. Upon acceleration of the shaft 32, the slider 253 is moved to the right along resistance 250. A contact provides a "dead spot" at the left end of resistance 250, so that small accelerations of the turbine 27 have no effect on the control system.

The network 223 includes a transformer secondary winding 260. A slidewire resistance 261 is connected by a conductor 262 to one terminal of secondary winding 260 and by a conductor 263 to a tap 270 at an intermediate point on secondary winding 260. A slider 264 cooperates with resistance 261 and is connected to conductor 224. The slider 264 and resistance 261 together form a velocity responsive compensating controller 265, which is operated by a velocity responsive control device schematically indicated at 266, which may be, for example, the velocity responsive controller described in detail in Figure 6. The slider 264 is moved over the resistance 261 by the velocity responsive control device 266 in accordance with an integrated time function of the velocity of shaft 32, as described more completely in connection with Figure 6.

The network 223 also includes a slidewire resistance 267. The left terminal of resistance 267 is connected through conductors 268 and 263 to the tap 270 on secondary winding 260. The right terminal of resistance 267 is connected through a conductor 271 to the right terminal of secondary winding 260. A slider 272 cooperates with resistance 267, and is connected to conductor 222. The slider 272 and resistance 267 together form a follow-up potentiometer 273. The slider 272 is moved along resistance 267 by the motor 200, acting through the gear train 201, and concurrently with the movement of the waste gate 31.

The specific details of the electrical control network illustrated in Figure 5 form no part of the present invention, but are shown and claimed in the copending joint application of Hubert T. Sparrow and Robert J. Kutzler, Serial No. 486,992, filed May 14, 1943, now Patent No. 2,466,282 of April 5, 1949.

*Operation of Figure 5*

All the secondary windings 230, 237 and 260 are either on the same transformer, which may be the transformer 206, or on one or more separate transformer whose primary windings are connected to the same source as the primary windings 209 of transformer 206. Therefore, the alternating potentials at the terminals of these transformer windings are in phase with each other. The signal potential impressed on the input terminals 220 and 221 of amplifier 211 is the alegbraic sum of a number of potentials produced in the networks 223, 225 and 227.

For the sake of convenience in considering the operation of this circuit, let us consider only the potential conditions existing during a half cycle when the terminals of the transformer windings have the polarities indicated by the legends in the drawing. In other words, the left-hand terminals of windings 237 and 260 are considered as positive and the upper terminal of secondary winding 230 is considered as positive. In order to have a reference potential, the conductor 228 is considered as being grounded at 285.

Considering first the network 227, it will be seen that when the slider 234 is in the position shown in the drawing, it is above the center of resistance 231, and hence its potential is positive with respect to that center. On the other hand, the slider 218 is at an intermediate point along the resistance 229, and hence its potential is negative with respect to the center tap on winding 230. It may therefore be seen that the network 227 introduces a potential into the series circuit connecting the amplifier input terminals, which potential is of a polarity such that slider 218 and conductor 226 are made negative with respect to the grounded conductor 228.

Considering next the network 225, it will be seen that, with the sliders 242 and 253 in the positions shown in the drawing, the network 225 introduces into the series circuit a potential equal to the potential of slider 242 with respect to the left terminal of secondary winding 237.

This potential is of a polarity such that slider 253 is positive with respect to slider 242. The potential of slider 253 with respect to ground depends upon the relative magnitudes of the opposing potentials introduced by the networks 227 and 225. For the purposes of the present discussion, it may be assumed that the potential introduced by network 225 is slightly larger than that introduced by network 227, and that hence slider 253 is positive with respect to ground.

Considering now the network 223, it will be seen that since slider 264 is at the extreme right end of its associated resistance 261, the conductor 263 is at the same positive potential with respect to ground as slider 253. The resistance 267 is connected across a portion of secondary winding 260 in such a manner that its left terminal is more positive than its right terminal. Since the slider 272 is at the center position along resistance 267, then the potential introduced into the series circuit is the potential between slider 272 and the left terminal of resistance 267. The network 223 therefore introduces a negative potential into the series circuit. Under balanced conditions, this negative potential has the same magnitude as the positive potential of slider 253 with respect to ground. The two potentials then oppose each other, so that the input terminal of 220 is at the same ground potential as input terminal 221 of amplifier 211. Therefore, no energy is supplied to the field winding 202 of motor 200 by the amplifier 211 which is effective to cause rotation of motor 200. Accordingly, the waste gate remains stationary and the compound network, including the three networks 223, 225 and 227 remain balanced.

Consider now the operation of the system when the sliders 234, 218, 253 and 264 remain in the positions shown in the drawing, and the pressure in the carburetor 16 increases. Such an increase in pressure in the carburetor 16 is transmitted to the bellows 245, where it causes slider 242 to move to the left along resistance 238. This reduces the magnitude of the positive potential introduced into the compound network by network 225. The positive potential in the compound network is then less than the sum of negative potentials introduced by the networks 227 and 223, and hence the amplifier input terminal 220 is negative with respect to input terminal 221. Let it be assumed that the connections of the amplifier are such that when a signal potential of this polarity, or phase, is applied to the amplifier input terminals, the motor field winding 202 is supplied with alternating current of such a phase that the motor 200 then operates in the proper direction to move the waste gate towards open position. At the same time, operation of the motor 200 in this direction causes a movement of slider 272 to the left along resistance 267.

The opening movement of the waste gate 31 reduces the pressure differential across the turbine 27 and thereby reduces the speed of the compressor 12 driven by the turbine. The reduction in the speed of the compressor lowers its compression ratio, thereby reducing the pressure of the air supplied to the carburetor 16 and transmitted to the bellows 245. At the same time, the movement of slider 272 to the left along resistance 267 reduces the balancing potential introduced into the compound network. This movement of slider 272 and of the waste gate continues until the positive potential introduced by controller 243 is exactly balanced by the sum of the potential introduced by network 227 and the balancing potential introduced by the follow-up controller 273, whereupon the motor 200 stops.

In a similar manner, it may be understood that a decrease in the pressure in the carburetor 16 causes movement of slider 242 to the right along resistance 238, and thereby introduces into the compound series network a potential having a polarity such that it tends to make amplifier input terminal 220 positive with respect to input terminal 221. This causes operation of the motor 220 in a direction to close the waste gate and to move slider 272 to the right along resistance 267, thereby increasing the balancing potential provided by follow-up potentiometer 273, and at the same time increasing the pressure in the carburetor 16 to reduce the unbalancing potential due to the motion of slider 242.

Consider now the operation of the system when the sliders 234, 218, 242, and 264 remain in the positions shown in the drawing, and the slider 253 moves to the right along resistance 250 due to an excessive acceleration of the shaft 32. It will be seen that such a movement of slider 253 introduces into the series compound network a potential such that the input terminal 220 of amplifier 211 is rendered increasingly negative with respect to input terminal 221. As previously described, a signal potential having such a polarity applied to the input terminals of amplifier 211 causes the waste gate to move towards open position, thereby reducing the speed of the turbine and compressor, and causing movement of slider 272 to the left to rebalance the compound network.

Considering the effect of movement of slider 264 to the left along resistance 261 at a time when the sliders 234, 218, 242 and 253 are stationary, it will be seen that such a motion of slider 264 introduces a potential into the series network which tends to make amplifier input terminal 220 instantaneously negative with respect to input terminal 221. As before, such a signal potential causes a movement of the waste gate toward open position to reduce the speed of the turbine and compressor and a movement of slider 272 to the left to rebalance the control network.

There remains to be considered the effect of the network 227 on the operation of the control system when the sliders 242, 253 and 264 are stationary at the positions shown in the drawing. If the slider 234 is moved upwardly along resistance 231, the potential introduced into the network is such as to make amplifier input terminal 220 negative with respect to terminal 221, thereby causing an opening movement of the waste gate and a decrease in the intake manifold pressure. On the other hand, a downward movement of slider 234 from the position shown in the drawing makes amplifier input terminal 220 more positive than terminal 221, thereby causing operation of the waste gate toward closed position and increasing the pressure in the carburetor 16.

As in the case of the system of Figure 1, it may be desired to select any value of pressure at the carburetor within a range of from 15 to 32" of mercury. The main controller 243 is therefore designed to move from one end of its associated resistance to the opposite end as the carburetor intake pressure varies from 15 to 32" of mercury. Also, as in the case of Figure 1, it is desired that, once a particular value for the carburetor intake pressure has been selected, that as the waste gate is operated throughout its range of movement, the carburetor intake pressure varies over a range of say 1" on either side of the selected pressure as the waste gate is moved throughout its entire range. The transformer secondary winding 237 which supplies potential to the terminals of resistance 238 is therefore proportioned with respect to the section of secondary winding 260 which supplies potential to the terminals of resistance 267, that a movement of slider 242 over a distance of $2/17$ of its total range of travel causes a following movement of slider 272 from one end of its range of movement to the other.

*Figure 6*

There is shown in Figure 6 a control device which includes an acceleration responsive controller which may be used as the controller 255 of Figure 5, and a velocity responsive controller which may be used as the controller 266 of Figure 5. The details of the acceleration responsive controller form no part of the present invention, but are shown and claimed in the co-pending application of Daniel G. Taylor, Serial No. 476,801, filed February 22, 1943, which has now matured into Patent No. 2,427,239 granted September 9, 1947. The details of the velocity responsive controller shown in Figure 6 also form no part of the present invention, being shown and claimed in the co-pending joint application of Hubert T. Sparrow, Daniel G. Taylor, and Glenn H. Witts, Serial No. 486,828, filed May 13, 1943, which has matured into Patent Number 2,394,213, granted February 5, 1946.

Referring to Figure 6, there is shown a housing 301, having an aperture in the central portion of its base, through which aperture passes a shaft 302, the lower end of which is keyed or otherwise adapted for operative connection with an extension of the shaft 32 of turbine 27 (see Figure 5). The center portion of the base of casing 301 carries a bearing 303 in which the shaft 302 is journaled. The casing 301 is provided with a cover 304 carrying a bearing 305 in its central portion, in which bearing the upper end of the shaft 302 is journaled.

A mass 306, having a hollow, generally cylindrical form is rotatably mounted on the shaft 302 by means of a bearing 307. A cover 308 is attached to the upper surface of the mass 306 by means of screws 310, and is provided with a bearing 311 in which the shaft 302 is journaled. A coil spring 312 has one end suitably attached to a collar 313 carried by the shaft 302, and its other end is received in a suitable aperture in an extension of the cover 308. The mass 306 is thereby flexibly connected to the shaft 302. When the shaft 302 is rotating at a constant speed, the angular position of the mass 306 with respect to the shaft 302 does not change, but upon acceleration of the shaft 302 the mass 306 changes its angular position with respect to the shaft 302 because of its inertia. The spring 312 permits a limited amount of relative movement of the shaft 302 and mass 306, and biases the mass 306 so that it always returns to the same angular position with respect to shaft 302 after such a relative movement.

The outer periphery of the cover 308 is beveled, and is adapted to interfittingly engage a similar beveled portion at the lower end of a cylindrical cam member 314. The cylindrical cam member 314 is held in place against the cover 308 by means of an outer clamping ring 315 which engages the outer surface of the beveled portion of cam member 314. The ring 315 may be clamped against the cover 308 by means of bolts 316. When so clamped, it holds the cam member 314 against rotation relative to the mass 306. By loosening the bolts 316, the cam member 314 may be adjusted to any desired angular position with respect to the mass 306.

The shaft 302 is slotted, as at 317. The portion of shaft 302 above the slot 317 is hollow. A pin 318 passes through the slot 317, and has its opposite ends fixed in a collar 319, which is slidable along the shaft 302. Because of the pin 318 and slot 317, the collar 319 is not rotatable with respect to shaft 302.

The collar 319 carries a spider comprising a plurality of arms 321, each of which has a bent-up extremity, and in that extremity carries a stub shaft 322, on which rotates a roller follower 323 for cooperation with the cylindrical cam 314. In the structure shown in the drawing, there are three arms 321 on the spider. The cam member 314 is circumferentially divided into three similar cam portions, having a gradual rise from the lowest point thereon to a high point thereon. At the high point of the cam, the cam surface suddenly rises, terminating in an almost vertical portion, thereby limiting the angular movement of the cam with respect to the follower assembly, which includes the spider arms 321 and the followers 323. A collar 324 is fixed to the shaft 302 and carries a plurality of outwardly extending arms 325, which are equal in number to the spider arms 321. Each of the arms 325 has a bent-up portion 326, which is received in an aperture in one of the arms 321. The purpose of the arms 325 and their extensions 326 is to guide the follower assembly and to prevent its rotation relative to the shaft 302. While I prefer to use three similar cam portions, and three followers spaced at equal angles, because of balance considerations, it should be understood that any suitable number of cam portions and followers may be used.

Within the hollow portion of the shaft 302 above the pin 318, there moves a thrust rod 327. The thrust rod 327 is tapered at both ends to fit into craters in the pin 318 and in a cross head 328, whose ends are slidably received in a pair of spaced plates 330 and 331, the latter being broken away in the drawing to illustrate the parts beneath it. The rod 327 is preferably of smaller diameter than the passage through the shaft 302, so that it does not frictionally engage the shaft. Also, the tapered ends of the rod 327 have a more acute angle than the craters in which they ride, so as to reduce friction at those points.

A U-shaped bracket 332 is pivotally mounted on the plates 330 and 331, as shown at 333. Only one leg of the U-shaped bracket 332 appears in the drawing, but it is believed that its construction will be readily apparent. A pin and slot connection 334 is provided so that the bracket 332 may be angularly adjusted about the pivot 333. The ends of arms of the U-shaped bracket member 332 carry a shaft 335. Pivotally mounted on the shaft 335 is a bracket 336, a portion of which extends into the path of movement of the cross head 328. The right-hand portion of the bracket 336 terminates in a tongue 337. A tension spring 338 is stretched between the tongue 337 and another tongue 340 associated with the plates 330 and 331. The spring 338 biases the bracket 336 for counter-clockwise rotation about the shaft 335, thereby maintaining the bracket 336 in engagement with the cross head 328.

The left end of bracket 336 carries an insulating plate 341, on which is mounted a slider 342. The extremity of slider 342 cooperates with a slidewire resistance 343, which is mounted on the cover 304 of the casing 301. The opposite ends of the slidewire 303 are connected through conductors 344 and 345 to pins in a multiple plug electrical connector carried on a projection from plates 330 and 331. The top of a cap 347 encloses the resistance 343 and its related elements. A pig tail connection 348 connects the slider 342 to another of the pins in the multiple plug electrical connector.

*Operation of acceleration responsive controller*

The shaft 302 rotates in a counter-clockwise direction as viewed from the bottom in Figure 6.

When the shaft 302 is rotating at a constant velocity, the angular position of the mass 306 relative to the shaft 302 is such that the followers 323 rest near the lower portions of the cam member 314. At that time, the pin 318 is near the bottom of the slot 317, and the slider 342 is near the lower end of the slidewire resistance 343.

Upon acceleration of the shaft 302, relative movement takes place between the mass 306 and the shaft 302, as previously explained. Since the cam 314 is fixed to the mass 306, and since the followers 323 move angularly with the shaft 302, the relative motion of the mass 306 and shaft 302 causes the followers 323 to be moved up the surfaces on the cam member 314, thereby moving the pin 318, the thrust rod 327, and the slider 342 upwardly. Movement of the slider 342 in an upward direction is equivalent to the movement of slider 253 of Figure 5 to the right along resistance 250.

Velocity responsive controller

A plate 350 is fixed on the shaft 302 just below the mass 306. The plate 350 is provided with diametrically opposite pairs of downwardly extending ears 351. In each of the pairs of ears 351 is journaled a shaft on which is carried a weight 352. An extension 353 of the weight 352 extends toward the shaft 302, so as to provide a sort of bell-crank lever arrangement. The extensions 353 on the weights 352 engage the upper surface of a housing 354 which is slidable on the shaft 302. A compression spring 355 is carried within the housing 354 and between the top of the housing and a nut 356, which is threaded on a sleeve 357 fixed on the shaft 302. The sleeve 357 is flattened along one side, as indicated at 358. A washer 360 retains the spring 355 between the nut 356 and the housing 354. The aperture in the washer 360 is shaped to conform with the sleeve 358, so that the washer is not rotatable on the sleeve. The washer 360 has a down struck lug at one side thereof which engages one of the exterior surfaces of the nut 356 and prevents rotation of the latter.

When it is desired to adjust the tension in the spring 355, the washer 360 may be forced upwardly, freeing the down struck lug 361 from engagement with the nut, whereupon the nut 356 may be rotated on the sleeve 357. After the nut has been moved to its desired position, the washer 360 may then be released, allowing the lug 361 to again engage nut 356 and lock it against rotation.

The lower portion of the housing 354 is attached to a plate 362, which bears against a sleeve 359, nested with a cup-shaped member 363. The sleeve 359 is preferably made of Bakelite, or other suitable wear resisting material. The cup-shaped member 353 is pivotally mounted on a pair of stub shafts 369 (see Fig. 3), which are fixed at diametrically opposite points on the cup-shaped member 353, and are journaled in flanges on a lever 364. The lever 364 is pivoted on a shaft 365, which is journaled in a pair of ears bent up from the opposite sides of one end of a generally flat spring member 379. The other end of the spring member 379 is riveted, as at 395, to a plate 396 fixedly mounted in the casing 301. A bolt 397 passes through a nut 398, which is fixed to the casing 301 by any suitable means. The upper end of bolt 397 engages the under surface of spring member 379, which is self-biased into engagement with bolt 397. It will be seen that by turning the bolt 397, the fulcrum point of the lever 364 may be moved upwardly or downwardly, thereby providing an additional means for adjusting the speed of shaft 302 at which lever 364 is actuated to its controlling position, as explained hereinafter.

The lever 364 extends from the pivot 365 across the casing 301, spanning the shaft 302 and carrying a button 366 adapted to bear against the end of a clutch shaft 367, which is biased upwardly into engagement with the button 366 by means of a compression spring 368.

A portion of the shaft 302 is splined, or cut for a gear pinion as at 370, and a gear 371 mates with the splines 370. The gear 371 is rotatably mounted on the clutch shaft 367. Through a suitable gearing connection, not shown in the drawing, a second gear 372 also rotatably mounted on the clutch shaft 367 is driven in the opposite direction to the gear 371 and at a lower speed. It may be for example, that the gear 372 is driven at one-third the speed of the gear 371. The clutch shaft 367 also carries a double faced clutch member 373, which is fixed on the said clutch shaft. Near its upper end, the clutch shaft carries a gear 374, which is also fixed on the clutch shaft, and which mates with a gear 375 fixed on a threaded shaft 376. An internally threaded nut 377 rides on the threaded shaft 376, and is moved therealong upon rotation of the shaft 376. The nut 377 carries a slider, not shown on the drawing, which engages the surface of a slidewire resistance 378 mounted in back of the shaft 376. An extension 380 at the end of lever 364 lies in the path of the nut 377 at the lower end of its range of movement.

Operation of velocity responsive control device

As long as the angular velocity of the shaft 302 is below a predetermined value, determined by the compressive force of spring 355, the clutch shaft 367 is biased upwardly by the springs 368 so that clutch 373 engages gear 372. At such a time, the clutch shaft 367 is rotated in a direction so that the threaded shaft 376 rotates to carry the nut 377 downwardly. If the rotative speed of the shaft 302 remains below the said predetermined value for a sufficient length of time, the nut 377 moves downwardly until it engages the extension 380 of the lever 364, whereupon the lever 364 is moved downwardly, carrying with it the clutch shaft 367 and causing disengagement of clutch 373 from the gear 372. Thereupon the clutch shaft 367 and the threaded shaft 376 are no longer rotated, and the slider carried by the nut 377 remains at the lower end of resistance 378.

If the angular velocity of the shaft 302 increases beyond the value determined by the compression of the spring 355, the centrifugal force acting on the weights 352 causes them to move outwardly, and the extensions 353 on the weights 352 move the housing 354 downwardly, thereby carrying the lever 364 downwardly. This further downward movement of lever 364 causes the clutch shaft 367 to be moved downwardly, carrying the clutch 373 into engagement with gear 371. The clutch shaft 367 is thereupon rotated in such a direction that the threaded shaft 376 rotates in a direction to move the nut 377 upwardly, thereby moving the slider carried by nut 377 upwardly along the resistance 378.

An upward movement of this slider along resistance 378 corresponds to a movement of slider 364 of Figure 6 to the left along resistance 261.

It may therefore be seen that as long as the angular velocity of shaft 302 remains below a predetermined value, the slider is maintained at the lower end of resistance 376. When it increases above that value, the slider is moved upwardly along the resistance 376. The position of the slider on the resistance 376 at any time is not determined by the angular velocity of the shaft 302 at that particular instant, but is determined by the length of time during which the angular velocity of the shaft 302 has been above that predetermined value, and by the particular variations in angular velocity of shaft 302 which has taken place since it first exceeded that predetermined value. The position of the slider along the resistance 378 is therefore determined by a time function of the velocity of shaft 302, integrated over the entire interval during which that velocity is greater than a predetermined value.

It has been found, that in an intake manifold pressure control system of the type described, the use of such a controller, which operates in accordance with an integrated function of the velocity of the compressor, provides a control which effectively limits the angular velocity of the compressor without establishing a definite and absolute limit, which would result in a hunting condition being set up.

A limit control of the type described effectively prevents the limiting condition from rising above a predetermined value, but nevertheless under any given set of conditions, permits a further increase in the limiting condition, and thereby prevents sudden unbalancing effects in the system which might cause undesirable hunting conditions to be established.

While I have shown and described certain preferred embodiments of my invention, it will be readily understood that modifications thereof will readily appear to those who are skilled in the art, and I therefore wish to be limited only by the scope of the appended claims.

I claim as my invention:

1. Apparatus for controlling the pressure of the air supplied to an engine provided with a power driven compressor, comprising in combination, means responsive to the pressure of the air supplied by said compressor, means for controlling the compressing effect of said compressor, motor means for operating said compressing effect controlling means, means modulatingly responsive to the acceleration of said compressor, and means including said pressure responsive means and said acceleration responsive means for controlling said motor means to operate said compressing effect controlling means in such a manner as to maintain the pressure of the air supplied by said compressor at a value which is modulatingly decreased in accordance with the extent of acceleration of said compressor whenever said acceleration exceeds a predetermined value.

2. Apparatus for controlling the pressure of the air supplied to an engine provided with a power driven compressor, comprising in combination, means for controlling the speed at which said compressor is driven, motor means for operating said compressor speed controlling means, means responsive to the pressure of the air supplied by said compressor, means modulatingly responsive to the speed of said compressor, means modulatingly responsive to the acceleration of said compressor, and means including said pressure responsive means, said speed responsive means, and said acceleration responsive means for controlling said motor means to operate said compressor speed controlling means in such as manner as to tend to maintain the pressure of the air supplied by said compressor at a value which is modulatingly decreased in accordance with the extent of acceleration and the speed of said compressor whenever said acceleration or speed exceeds predetermined values.

3. Electrical apparatus for controlling the pressure of the air supplied to an engine provided with a power-driven compressor powered by the exhaust gases of said engine, comprising in combination, means for controlling the speed of said compressor, electrical motor means for operating said compressor speed controlling means, a normally balanced electrical network, a first impedance connected in said network, means responsive to the pressure of the air supplied by said compressor for modulatingly varying said impedance to unbalance said network, a second impedance connected in said network, means responsive to the speed of said compressor for modulatingly varying said second impedance to unbalance said network, a third impedance connected in said network, means responsive to the acceleration of said compressor for modulatingly varying said third impedance to unbalance said network, means responsive to the unbalance of said network for controlling said motor means, a fourth impedance connected in said network, and an element driven by said motor means for varying said fourth impedance to rebalance said network.

4. Apparatus for controlling the pressure of the air supplied to an engine provided with a power driven compressor, comprising in combination, means for controlling the speed at which said compressor is driven, motor means for operating said compressor speed controlling means, a first modulatingly variable control device, means responsive to the pressure of the air supplied by said compressor for operating said first control device, a second modulatingly variable control device, means responsive to the speed of said compressor for operating said second control device, means responsive to the acceleration of said compressor for operating said second control device, and means including both said control devices for controlling said motor means to cause said speed controlling means to assume a position dependent upon the values of both the pressure of the air and the speed and acceleration of the compressor.

5. Apparatus for controlling the pressure of the air supplied to an engine provided with a power driven compressor, comprising in combination, means for controlling the speed at which said compressor is driven, motor means for operating said compressor speed controlling means, a first modulatingly variable control device, means responsive to the pressure of the air supplied by said compressor for operating said first control device, a second modulatingly variable control device, means responsive to the speed of said compressor for operating said second control device, a third modulatingly variable control device, means responsive to the acceleration of said compressor for operating said third control device, and means including all said control devices for controlling said motor means to cause said speed controlling means to assume a position dependent upon the values of the pressure of the air and the speed and acceleration of said compressor.

6. Apparatus for controlling the pressure of the air supplied to an engine provided with a power driven compressor, comprising in combination, means for controlling the speed at which said compressor is driven, motor means for operating said compressor speed controlling means, a first modulatingly variable control device, means responsive to the pressure of the air supplied by said compressor for operating said first control device, a second modulatingly variable control device, means responsive to the acceleration of said compressor for operating said second control device, a third modulatingly variable control device, means for operating said third control device in accordance with the time during which the speed of said compressor exceeds a predetermined value, and means including all said control devices for controlling said motor means.

7. Apparatus for controlling the pressure of the air supplied to an engine provided with a power driven compressor, comprising in combination, means for controlling the speed at which said compressor is driven, motor means for operating said compressor speed controlling means, a first modulatingly variable control device, means responsive to the pressure of the air supplied by said compressor for operating said control device, a second modulatingly variable control device, means for operating said second control device to a position dependent upon the length of time during which the speed of said compressor exceeds a predetermined value, and means including both said control devices for controlling said motor means.

8. Apparatus for controlling the pressure of the air supplied to an engine provided with a power driven compressor, comprising in combination, means for controlling the speed at which said compressor is driven, motor means for operating said compressor speed controlling means, a modulatingly variable control device, means for operating said control device to a position dependent upon the length of time during which the speed of said compressor exceeds a predetermined value, and means including said control device for controlling said motor means.

9. Apparatus for controlling the pressure of the air supplied to an engine provided with a power driven compressor, comprising in combination, means for controlling the compressing effect of said compressor, motor means for operating said compressing effect controlling means, means modulatingly responsive to the acceleration of said compressor, and means including said acceleration responsive means for controlling said motor means to cause said compressing effect to be adjusted in accordance with the extent of acceleration of said compressor.

10. Electrical apparatus for controlling the pressure of the air supplied to an engine provided with a power driven compressor, comprising in combination, means for controlling the speed at which said compressor is driven, electrical motor means for operating said compressor speed controlling means, an electrical impedance network, a first impedance connected in said network, means responsive to the pressure of the air supplied by said compressor for modulatingly varying said impedance, a second impedance connected in said network, means responsive to the speed of said compressor for modulatingly varying said second impedance, a third impedance connected in said network, means responsive to the acceleration of said compressor for modulatingly varying said third impedance, and means responsive to an electrical condition of said impedance network affected by the values of all said impedances for controlling said motor means to control the speed of said turbine.

11. Electrical apparatus for controlling the pressure of the air supplied to an engine provided with a power driven compressor powered by the exhaust gases of said engine, comprising in combination, means for controlling the speed at which said compressor is driven, electrical motor means for operating said compressor speed controlling means, an electrical impedance network, a first impedance connected in said network, means responsive to the pressure of the air supplied by said compressor for modulatingly varying said impedance, a second impedance connected in said network, means responsive to the speed of said compressor for modulatingly varying said second impedance, means responsive to the acceleration of said compressor for modulatingly varying said second impedance, and means responsive to an electrical condition of said impedance network affected by the values of both of said impedances for controlling said motor means to control the speed of said turbine.

12. Electrical apparatus for controlling the pressure of the air supplied to an engine provided with a power driven compressor powered by the exhaust gases of said engine, comprising in combination, means for controlling the speed at which said compressor is driven, electrical motor means for operating said compressor speed controlling means, an electrical impedance network, a first impedance connected in said network, means responsive to the pressure of the air supplied by said compressor for modulatingly varying said impedance, a second impedance connected in said network, means for modulatingly varying said second impedance in accordance with the time during which the speed of said compressor exceeds a predetermined value, and means responsive to an electrical condition of said network affected by the values of both said impedances for controlling said motor means to control the speed of said compressor.

13. Electrical apparatus for controlling the pressure of the air supplied to an engine provided with a power driven compressor, comprising in combination, means for controlling the speed at which said compressor is driven, electrical motor means for operating said compressor speed controlling means, a variable impedance, means for varying said impedance in accordance with the time during which the speed of said compressor exceeds a predetermined value, and means including said impedance for controlling said motor means.

14. Control apparatus, comprising in combination, a load device to be controlled, motor means for driving said load device, means responsive to a condition indicative of the need for operation of said load device, means responsive to the time that a limiting condition exceeds a predetermined value thereof, and means including said condition responsive means and said last named means for controlling said motor means.

15. Electrical control apparatus, comprising in combination, a load device to be controlled, electrical motor means for operating said load device, a normally balanced electrical network, a first impedance connected in said network, means responsive to a condition indicative of the need for operation of said load device for modulatingly varying said impedance to unbalance said network, a second impedance connected in said network, means for integrating the variations of a limiting condition beyond a predetermined value thereof and for varying said second impedance in accordance with said integration to unbalance said network, means responsive to the unbalance of said network for controlling said motor means, a third impedance connected in said network, and an element driven by said motor means for varying said third impedance to rebalance said network.

16. In combination, a turbosupercharger actuated by exhaust gases, a waste gate for regulating the flow of exhaust gases to the turbine, a polyphase alternating current motor for positioning said waste gate, a source of alternating current, means for continuously energizing one phase winding of said motor from said source of alternating current, an electronic amplifier for energizing another phase winding of said motor with an alternating current which either leads or lags said alternating current of said source to cause rotation of said motor either in one direction or the other, and means responsive to a predetermined pressure appurtenant to an operating condition of said supercharger for controlling said amplifier to cause said motor to position said waste gate so as to maintain said pressure at a substantially constant value over a predetermined range of operation.

17. In combination, a turbosupercharger actuated by exhaust gases, a waste gate for regulating the flow of exhaust gases to the turbine, a polyphase alternating current motor for positioning said waste gate, a source of alternating current, means for continuously energizing one phase winding of said motor from said source of alternating current, an electronic amplifier for energizing another phase winding of said motor with an alternating current which either leads or lags said alternating current of said source to cause rotation of said motor either in one direction or the other, means responsive to a predetermined pressure appurtenant to an operating condition of said supercharger for controlling said amplifier to cause said motor to position said waste gate and maintain said pressure at a substantially constant value over a predetermined range of operation, and speed responsive means driven by said supercharger for controlling said amplifier and consequently said motor for positioning said waste gate at speeds of said supercharger above the highest speed within said range of operation.

HUBERT T. SPARROW.

REFERENCES CITED

The following references are of record in the file of this patent:

UNITED STATES PATENTS

| Number | Name | Date |
|---|---|---|
| 1,325,255 | Loewenstein | Dec. 16, 1919 |
| 1,508,707 | Moss | Sept. 16, 1924 |
| 1,508,731 | Standerwick | Sept. 16, 1924 |
| 1,550,184 | Spain | Aug. 18, 1925 |
| 1,655,683 | Standerwick | Jan. 19, 1928 |
| 2,106,237 | Bush | Jan. 25, 1938 |
| 2,248,711 | Le Fevre | July 8, 1941 |
| 2,306,277 | Oswald | Dec. 22, 1942 |

FOREIGN PATENTS

| Number | Country | Date |
|---|---|---|
| 479,278 | Great Britain | Jan. 28, 1938 |